March 22, 1955   B. B. JOHNSON ET AL   2,704,785
AUTOMATIC TELEPHONE-EXCHANGE SYSTEMS
Filed May 1, 1950   4 Sheets-Sheet 1
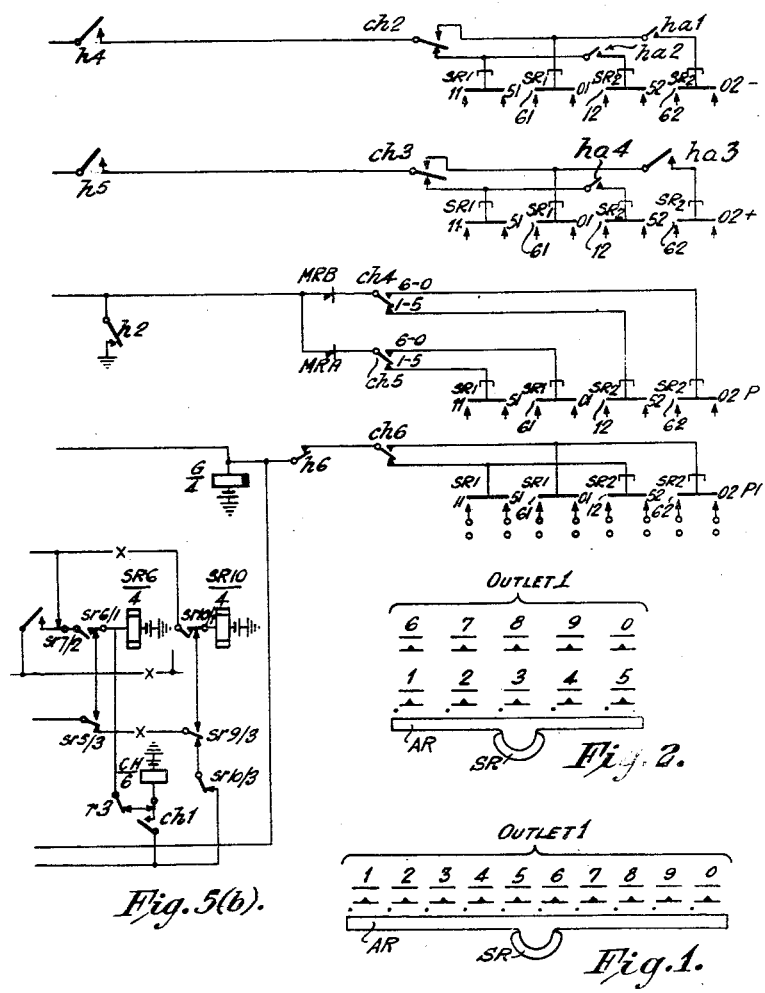

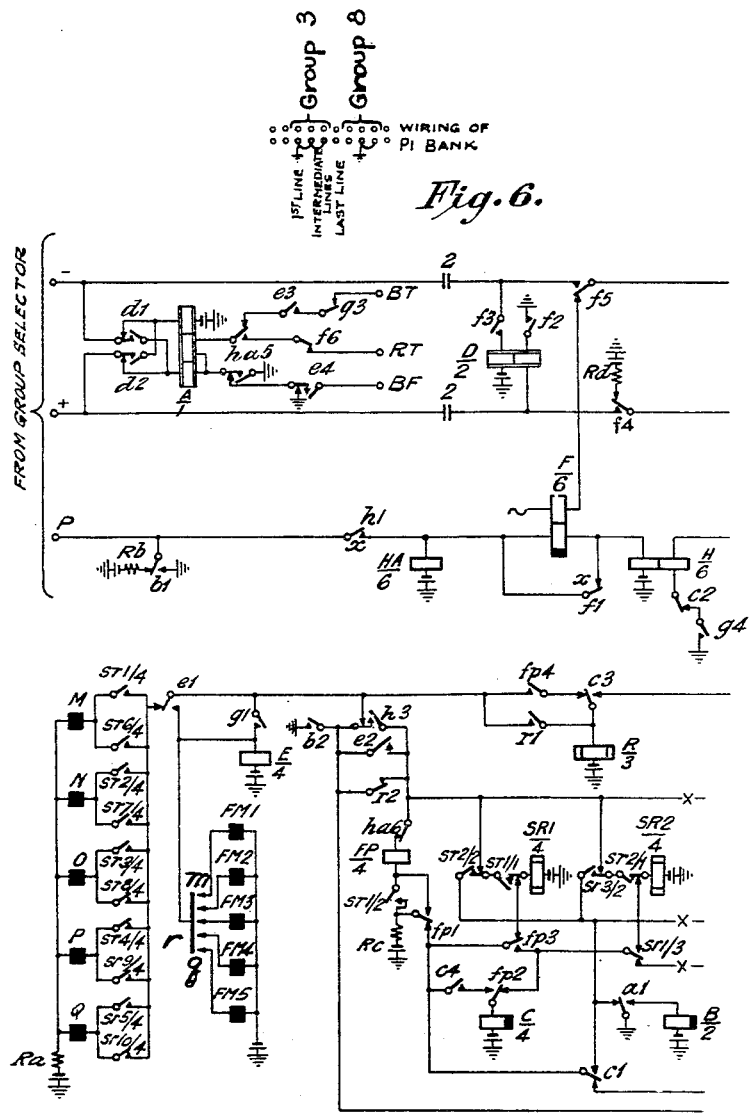

United States Patent Office 2,704,785
Patented Mar. 22, 1955

2,704,785

AUTOMATIC TELEPHONE-EXCHANGE SYSTEMS

Benjamin Bertie Johnson, Streatham, London, and William Gordon Foster, Highams Park, London, England, assignors to Telephone Manufacturing Company Limited, London, England, a company of Great Britain Application May 1, 1950, Serial No. 159,321

Claims priority, application Great Britain May 2, 1949

11 Claims. (Cl. 179—18)

This invention relates to automatic telecommunication exchange.

The invention provides an improved selecting stage, which may be a group-selecting stage or final-selecting stage, the words group-selecting stage and final-selecting stage being given their usual signification, in which digit controlled switching to a succeeding stage or to a subscriber's line is effected by relay devices hereinafter referred to as selective relay units.

Briefly a selective relay unit may be said to consist of an electro-magnetic relay having a plurality of banks of contacts with means for determining which bank of contacts shall be operated upon by the relay armature when its operating electro-magnet is energized. It differs from the corresponding part of a so-called cross-bar switch in that selection of a bank of contacts instead of being effected by a bar, one of a number extending across a number of units, is effected by finger magnets, one of a number, individual to the unit and associated one with each bank of contacts.

A finger magnet is an electro-magnet which operates upon a single finger for interposing said finger between the bank of contacts with which it is associated and the armature of the selective relay unit.

According to the present invention, an automatic telephone-exchange system includes at least one selector switch, which (or each of which) comprises a plurality of selective relay units of the type referred to, and circuit arrangements interconnecting the electro-magnets of the selective relay units, whereby the said units serve first as a numerical selector for the selection of a level in the selector switch and then both as a numerical or non-numerical selector for the selection of an outlet in the selected level and as a switch to effect a connection between the incoming trunk and the selected outlet in the selected level.

A telephone-exchange system as above set out, includes a register which is operated temporarily to register the digit selector by the selective relay units in their first operation, and thereafter, when the selective relay units have reset themselves preparatory to performing their second selective operation, to bring about the operation of all the finger magnets in the level represented by the selected digit, so that upon the second selective operation a connection to the free or digitally determined outlet in the selected level may be effected.

In the above statements, and in what follows, the term "level" has no physical meaning but signifies the group, be it thousands, hundreds, or tens in which a wanted line will be found.

The invention is illustrated in, and further discussed in connection with, the accompanying drawings, of which:

Figure 1 illustrates a selective relay unit;

Fig. 2 illustrates a preferred arrangement of a selective relay unit;

Figure 4B:
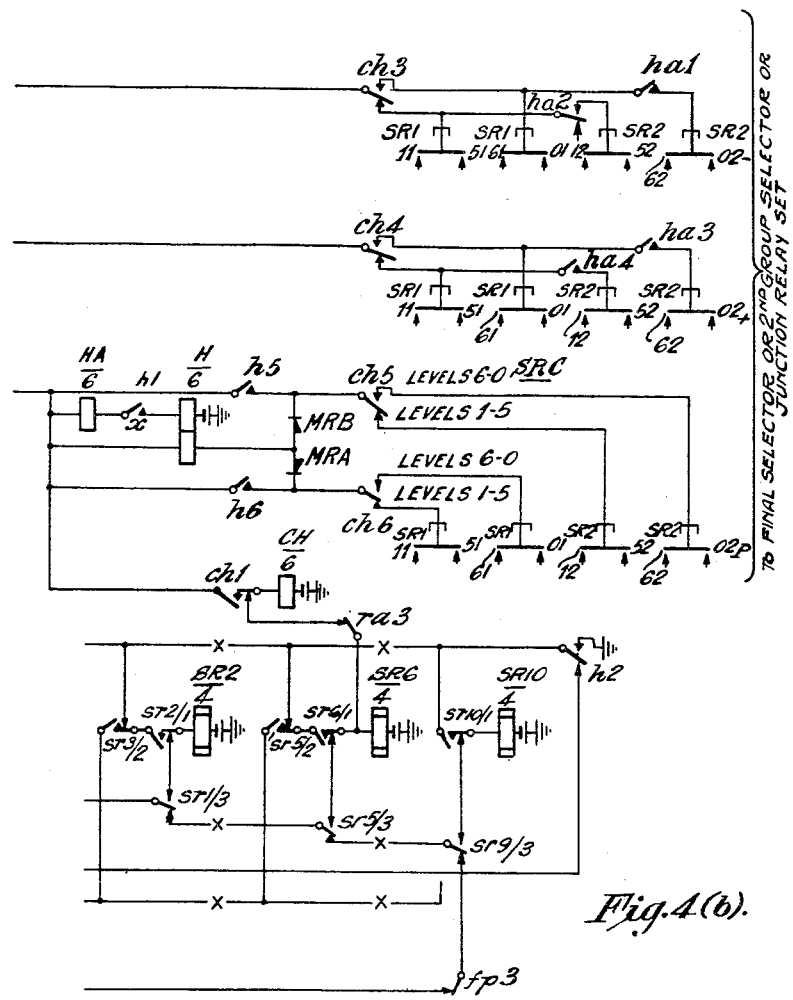
Figure 4A:
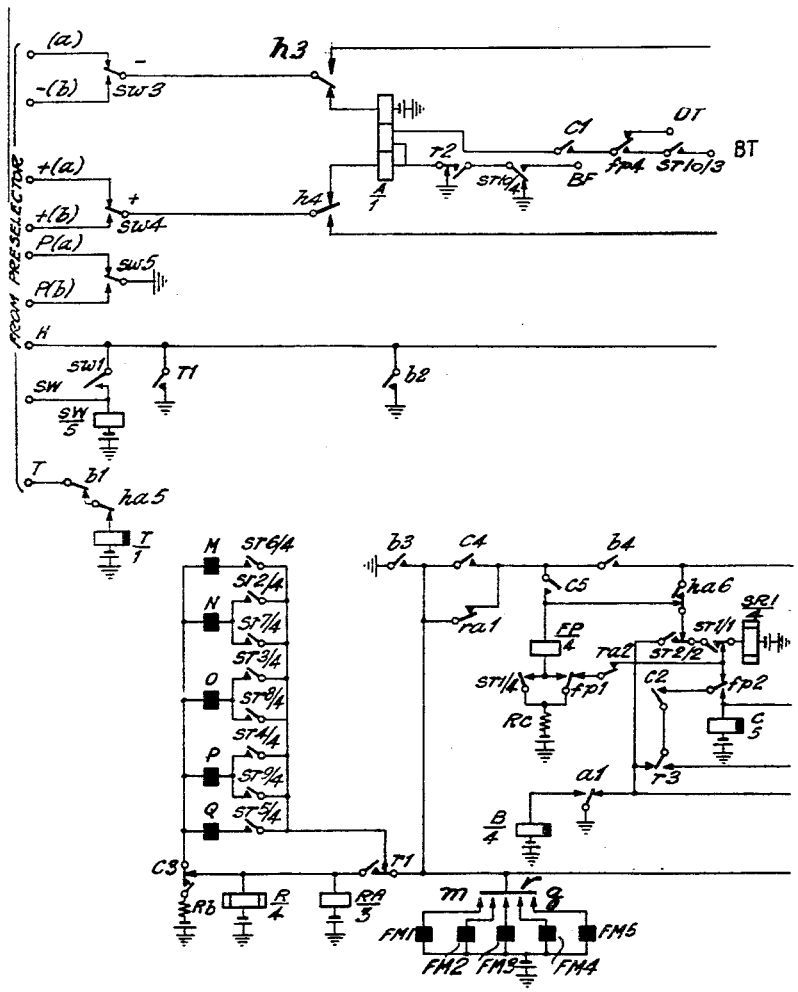

Fig. 4, which is in two parts numbered respectively Fig. 4(a) and Fig. 4(b) illustrates a group (one-digit) selector, and;

Fig. 5, which is also in two parts numbered Fig. 5(a) and Fig. 5(b), illustrates a final selector; and Fig. 6 illustrates a modification of our invention as applied to P. B. X operation.

The two parts of Fig. 4 or 5 when placed side by side with part (a) to the left, constitute respectively single Figs. 4 and 5.

Figure 3:
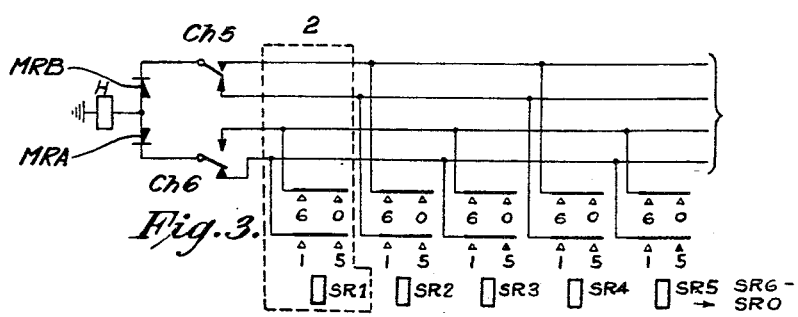
Fig. 3 illustrates a group selector or final selector comprising ten selective relay units (of which only five are shown)

In Figs. 3 to 5, the analytical method has been adopted.

A selective relay unit (hereinafter referred to as a SRU), as illustrated quite diagrammatically in Fig. 1, consists of ten banks of contacts numbered respectively 1 to 9 and 0, an armature AR, an energizing magnet SR, and ten fingers, shown as points, one to the left of each bank of contacts. A finger magnet is associated with each finger. If, with all the fingers in the positions shown the armature AR is operated, it will be unable to operate any of banks of contacts. If any finger is moved to the right, so as to come beneath the bank of contacts with which it is associated and if the armature be thereafter operated, the bank of contacts can be operated upon. Thus a means is provided for selecting by energizing any one of the finger magnets any one of the banks of contacts 1 . . . 0.

This while an entirely practical arrangement, is not the preferred arrangement because the armature of the SRU is longer than is necessary. It is preferred to provide each SRU with five banks of contacts (each bank, of course, having more contacts) and five finger magnets. Such a SRU is illustrated in Fig. 2. Here the banks of contacts 6, 7 ,8, 9, 0, have been placed respectively above banks 1 . . . 5, the armature AR has been shortened, and only five fingers are provided. If any finger is interposed between its associated bank of contacts and the armature AR and the latter be thereupon operated, two sets of contacts in the bank will be acted upon.

Since these two contacts lead to two different groups of subscriber's lines, for example, groups 1 and 6 or 2 and 7, and so on, it is necessary to distinguish which of the two is to be selected. This is effected, as will be described later by means of a change-over relay.

So far, we have described only a single SRU. A group selector or a final selector would, of course, comprise a number of such SRU's. Such a selector is illustrated, quite diagrammatically, in Fig. 3.

In Fig. 3, elements enclosed within a chain line and numbered generally 2, correspond with a SRU such as that shown in Fig. 2. In Fig. 3 only four contacts for each SRU are shown, namely, 1, 5, 6, and 0. In Fig. 3 and indeed in Figs. 1 and 2, only one set of contacts for each outlet is shown: there would, of course, be at least three, namely these for the A and B line conductors and that for the private or test conductor. In Fig. 3 the contacts shown are those for the private or test conductors.

A group selector or a final selector, such as shown in Fig. 3 would usually comprise ten SRU's but for simplicity only five are shown. Each SRU gives access to a different outlet in any one of ten numerical "levels" 1 to 9 and 0. Thus SRU1 gives access by way of the first trunk. SRU2 gives access to any one of the same levels by way of the second outlet and so on.

In the case of a group selector it will depend upon the busy or idle condition of the outlet which SRU shall operate, selection of the level being effected by which finger (see Fig. 3) is interposed between the banks of contacts and the armature. Selection of a one-figure number in this case is effected by first successively operating the SRU's in accordance with the digit (no fingers being interposed between the contacts and armature). The digit as recorded by the SRU's is transferred to a register and the SRU's are restored to their normal condition. The register then operates a finger magnet in each SRU associated with the level selected. Thus suppose, level 1 is to be selected, a finger will be interposed between the banks 1, 6, in all the SRU's and the magnets of the SRU's will then operate in succession until one of them finds an outlet in level 1 which is idle. Now since there is a finger in each SRU interposed between a particular bank of contacts and the armature, the SRU's are able to operate the banks of contacts.

In the case of a final selector the outlet in the selected level which is to be used will be selected by digit-control of the SRU's. Selection of a two figure number in this case is effected by first successively operating the SRU's in accordance with the first digit (no fingers being interposed between the contacts and armature). The first digit, as recorded by the SRU's, is transferred to a register and the SRU's are restored to their normal condition. The register then operates a finger magnet in each SRU, associated with the level selected. The SRU's are again successively operated, this time in accordance with the second digit of the two digit number, but now since there is a finger in each SRU interposed between a particular bank of contacts and the armature, the SRU's are able to operate the banks of contacts.

In the above brief description we have shown that the SRU's operate in succession as step-by-step operated relay selectors. Of course, relay selectors are well known, and for each stepping stage a relay selector may comprise two relays or only one relay.

In the case in which a step-by-step selector comprises two relays for each stepping stage, which is not the preferred arrangement for the SRU's used in the present invention though it is quite a feasible arrangement, only one at a time of the operative relays would affect the contacts. In the case of a relay selector having only one relay for each digit stage two relays are operated during part of each impulse. As will be evident, in such a case, the test wires of the outlets would be presented to the incoming trunk simultaneously. This can be seen from a consideration of Fig. 3.

The idle condition of an outlet is represented by negative potential on the test wire and the busy condition is represented by positive potential on the test wire. It is thus evident that the negative on an idle outlet would be shunted away from the testing relay by the positive on the simultaneously presented other line. This can be seen by a study of Fig. 3, if one considers that the contact number 1 in SRU1 is the test contact of a busy line and that the contact 1 in SRU2 is the test contact of an idle line, when SRU1 only is operated the positive on the test wire would in the absence of rectifier MRA be presented to relay H, and relay H would thereby not operate, this being the desired condition for the SRU's to continue their search. When SRU2 is operated a negative potential from its contact 1 is presented to relay H and this negative would in the absence of rectifier MRB and MRA be shunted to earth at contact 1 in SRU1 so that again relay H would be unable to operate. This however, is not the desired condition. Rectifiers MRB and MRA are therefore provided and are so poled that this shunting effect is prevented and the negative on an idle test wire is presented to the relay H in spite of the fact that a positive on a simultaneously connected test wire is presented towards relay H. Other methods of preventing short-circuiting of the negative of an idle outlet by the positive of a simultaneously presented busy outlet may be employed: for example, a relay may be provided, having its moving contact connected to the coil of relay H, and fixed front and back contacts connected to the moving contacts ch5 and ch6, the relay being operated when alternate SRU's are operated and not operated when the intermediate SRU's are operated. The arrangement shown is, however, preferred.

The above brief description of some of the features of the invention will enable the circuit description which now follows with reference to Figs. 4 and 5 to be more easily understood.

In Fig. 4(a) there is shown a register consisting of a SRU having an operating magnet R and five finger magnets M . . . Q. This register serves to hold the digit of the level to be selected and to operate the finger magnets (FM1 to FM5) whereby fingers in the several SRU's of the selector are interposed between the appropriate banks of contacts and the several armatures of the SRU's. (It should be noted at this stage that blocks referenced FM1 to FM5 each represent 10 finger magnets, thus FM1 represents the finger magnets under contacts 1 in each SRU of Fig. 3, and so on.

The group selector of Fig. 4 is approached from a preceding stage by any well known apparatus and a loop is presented to relay A.

Since the group selector is intended primarily for co-operation with a preselector it may be approached either over $-(a)$ and $+(a)$ or $-(b)$ and $+(b)$ depending upon whether relay SW and its contacts sw3 and sw4 are operated. In either case it returns earth over contacts sw5 to conductor P($a$) or P($b$). Also earth is returned over the holding wire H by contact $t1$, relay T having been operated from the preceding stage.

When, via the loop presented by the preceding stage, relay A operates, it completes, at contact $a1$, a circuit for relay B, which operates.

Relay B at contact $b1$, opens the circuit for relay T and at contact $b2$, takes over the duty of maintaining earth on conductor H. At $b3$, it connects earth to the counting chain comprising relays SR1 . . . SR10, which are the bar magnets of the SRU's for the group selector shown; it also closes a circuit for relay C (Fig. 4$a$) as follows: earth, $b3$, $fp3$, $sr9$ . . . $sr1$, C, negative. Contact $b4$ will be referred to later.

Relay C, at contact $c1$ connects dialling tone, from DT, to a calling line. Contacts $c2$ to $c4$ will be noticed as the circuits of which they form part, come into action.

Conditions are now right for the calling impulses to be received. At the first impulse, relay A releases and at contact $a1$ closes a circuit for relay SR1 (earth $a1$, $r3$, $c2$, $fp2$, $sr1/1$, relay SR).

Relay SR operates and at make-before-break contact $sr1$ closes a holding circuit for itself via $sr2/2$, $ha6$, $c5$, $b3$. (Contact $sr2/2$ is contact 2 of relay SR2, as contact $sr1/1$ is contact 1 of relay SR1). Contact $sr1/3$ will be noticed later. Contact $sr1/4$ closes a circuit for relay FP (earth, $b3$, $ra1$, $c5$, FP, $sr1/4$, RC, negative). Relay FP cannot yet operate, however, because it is short-circuited by earth from contact $a1$, over $r3$, $fp2$, $ra2$, $fp1$, $sr1/4$.

When relay A reoperates, the short circuit is removed from relay FP which operates and at contact $fp1$ closes a self-holding circuit. At contact $fp2$ it extends the impulse circuit to relay SR2 and to relay C. At contact $fp3$, the original circuit for relay C is opened. Contacts $fp4$ disconnects the dialling tone.

The second impulse operates relay SR2, which, at contact $sr2/1$ holds itself. Contact $sr2/2$ transfers relay SR1 from the holding earth at $b3$ to earth at $a1$. Contact $sr2/3$ (not shown) prepares an operating circuit (which is however, still open at $sr1/3$) for relay SR3. (Relays SR3, SR4 and SR5 are not shown but they are to be supposed to be connected at X between relay SR2 and SR6, in a manner which will be understood). Contact $sr2/4$ closes a circuit for finger magnet N in the register (Fig. 4($a$)). This circuit is earth, $b3$, $r1$, $sr2/4$, N, $c3$, resistance R$b$, negative.

Subsequent operations are similar, relays SR3, SR4, and so on, operating in turn until the last impulse is received. Each relay SR as it operates closes a circuit for one of the finger magnets in the register, and as it de-energizes opens the circuit for the finger magnet. The operated finger magnet M . . . Q interposes a finger between the armature $r$ of relay R and the contacts $m$ . . . $q$ of the register.

When the last pulse has been received, relay C releases and at $c3$ replaces resistance R$b$ by relays R and RA which are thus connected in parallel with each other and in series with the operated finger magnet M . . . Q. It also at contact $c5$ opens the holding circuit for relay FP which releases.

Relay R is the operating magnet of a SRU, which with finger magnets M . . . Q and banks $m$ . . . $q$ of contacts (only $m$ and $q$ are referenced) constitute the register. This relay operates its armature and so operates one of the banks of contacts $m$ . . . $q$ between which and itself a finger is interposed and, at its contact $r1$ closes a holding circuit for itself and for relay RA and opens the circuit of finger magnets M . . . Q. The operated finger is, however, mechanically held between the operated armature of relay R and the selected bank of contacts $m$ . . . $q$.

Each of the elements represented in Fig. 4($a$), as also in Fig. 5($a$), by the references FM1, FM2, FM3, FM4 and FM5, represents ten finger magnets. Thus the ten finger magnets represented by reference FM1 are associated with the first bank of contacts on all the selective relay units SRU1 . . . SRU10; they are connected in parallel with each other and each, when energized, interposes a finger between the first bank of contacts and the armature of the SRU with which it is associated. Similarly for the ten finger magnets represented by reference FM2 except that they are associated with the second bank of contacts on each SRU, and similarly for the ten finger magnets represented, respectively, by references FM3, FM4 and FM5, except that they are associated respectively with the third, fourth and fifth banks of contacts on the SRU's.

Relay RA, at its contact ra1 opens the holding circuit for the still-operated relay SR, which now releases, at its contact ra3 disconnects relay CH (Fig. 4(b)) which may not or may have been operated depending upon whether less than six, or six or over, impulses have been received. If CH had been operated it holds to earth at contact b2.

We observed above, that one of the banks of contacts m . . . q was operated when relay R operated its armature. Hereby a circuit is completed from earth at contact b3 for one of the groups FM1 . . . FM5 of finger magnets forming part of the group selector. Each finger magnet FM1 is adapted to interpose its finger between the first bank of contacts in a different one of the SRU's and its armature. Each finger magnet FM5 is adapted to interpose its finger between the fifth bank of contacts in a different one of the SRU's and its armature. Each finger magnet numbered FM2, FM3, or FM4, similarly interposes a finger between the armatures of a different one of the SRU's and the second, third or fourth bank of contacts (omitted from Fig. 4 for the sake of simplicity).

Conditions are now such that the SRU's can operate to select an idle outlet in the level selected.

At the time that relay FP and the operated relay SR released, a circuit was completed for relay C (earth b3, fp3, contacts sr9/3 . . . sr1/3.

Relay C operates and closes a circuit for relay SR1 (earth, b3, c4, b4, h2, r3, c2).

Relay SR1 closes a holding circuit for itself over contacts sr1/1 and c5, c4, to b3, and a circuit for relay FP (earth, b3, c4, c5, FP, sr1/4. This relay operates and holds (fp1).

Recalling that a finger is interposed between the armatures of all the relays SR1 . . . SR10 and a bank of contacts say bank 51 of those marked SR1 and belonging to SRU1, in each of them, the test wire of outlet one in the selected group is, by the operation of SR1, presented to test relay H. If this outlet is idle, negative is presented through rectifier MRA to relay H which operates and stops further searching. If the outlet is busy, earth is presented to rectifier MRA. Relay H thus cannot operate.

Because relay H cannot operate, relay SR2 will operate (earth, b3, c4, b4, h2, r3, c2, fp2, sr1/3, SR2).

Relay SR2 will present the test wire of the second outlet in the selected level to relay H. This process will continue until an idle outlet is found upon which relay H will operate from negative on the appropriate test wire through rectifier MRA or MRB.

Relay H at contact h1, closes a holding circuit for itself in series with relay HA, at contact h2 opens the operating circuit for further relays SR, at h3 and h4 switches the incoming line forward, and at h5 or h6 connects the holding circuit for relays H and HA, and for relay CH6 if operated, forward to earth to be returned from the next stage.

Relay HA operated in series with the holding circuit for relay H, and at contacts ha1 and ha2, and ha3 and ha4 (top of Fig. 4(b)) separated the connecting contacts of the odd numbered SRU's from those of the even numbered SRU's. (This is to prevent two outlets from being connected together during the searching operation when, it will be recalled, two SRU's are operated simultaneously). Contact ha5 disconnects relay T from wire T (because relay B is about to release). Contact ha6 provides a holding circuit for relay SR1.

When, at contacts h3 and h4, the connection was switched forward, relay A released and consequently all relays in the group selector, except H, HA, CH (if operated) and one SR will be released. Before relay B is released, however, the A relay in the next stage will have operated and have caused earth to be returned over the P wire from the next stage to replace that from contacts b2.

If all outlets are busy, that is relay SR10 has presented the tenth outlet to relay H and relay H has been unable to operate, because of the inability of relays C, FP, and R to release, busy tone from BT and busy flash from BF are returned via contacts sr10/3 and c1, and contacts sr10/4 and r2 respectively.

The next stage may be a group selector, such as that already described, or indeed of any convenient kind, or it may be a final selector which, again, may be of any convenient kind. It will, however, be assumed to be a final selector consisting of SRU's as shown in Fig. 5.

The arrangement and operation of the final selector shown in Fig. 5 is very similar to that of the group selector shown in Fig. 4, differing therefrom only insofar as is necessary by reason of its different function. The description will therefore be somewhat simplified.

When a connection is extended to the final selector from a preceding stage of whatsoever kind it may be, a loop is presented to relay A, Fig. 5(a) which operates and closes a circuit for relay B. Relay B at contact b1 replaces the negative, returned to the preceding stage, by earth and at b2 connects earth to the relays of the counting chain comprising, amongst others relays SR1 . . . SR10 (of which only SR1, SR2, SR6, and SR10 are shown), and relay C.

The first train of impulses is now received on relay A. Relay A, when it releases for the first impulse, closes a circuit for relay SR1, which operates and prepares a circuit for relay FP, and prepares a circuit for relay SR2. Relay A, when next it operates, permits relay FP to operate.

Relay FP operates and holds over its own contact fp1, at contact fp2 connects relay C to the back contact a1 of relay A, at fp3 it connects relays SR2 . . . SR10 to the back contact a1 of relay A.

Subsequent impulses cause relays SR2 . . . SR10 to operate in succession, and each as it operates closes a circuit for one of the finger magnets M . . . Q of the register (the circuit is earth, contact b2, h3, e1, the contacts sr1/4 . . . sr10/4 in turn.

When the last impulse of this first train has been received, one and one only of relays SR1 . . . SR10 is operated so that one of the finger magnets M . . . Q remains operated. The finger magnet which remains operated maintains a finger between the armature r of relay R and one of the banks m . . . q of the register, so that when, in a manner to be described, relay R operates, a circuit is closed for one of the groups of finger magnets FM1 . . . FM5.

The end of the train of impulses is indicated by relay A remaining operated for a somewhat prolonged period, as is well known.

As a result of the prolonged operation of relay A, slow-to-release relay C releases and closes, at contact c3, a circuit for relay R. Relay R operates and at contact r1 closes a holding circuit for itself. At contact r2 the holding circuit of the operated relay SR and of relay FP is opened and these relays are thereby released. At r3 relay CH is cut out since it will not be required to operate in response to the sixth impulse of the second train. It would have been required to operate if this first digit had been higher than five.

Relay R also prepares the circuit of ten finger magnets (represented by one of the blocks FM1 . . . FM5), one associated with each of the ten SRU's of the final selector.

When, upon the operation of relay R, relays SR and FP released a circuit was re-established for relay C, as a result of which relay C re-operated.

Contact c3 closes a circuit for relay G, Fig. 5(b) via contacts r1, h3 and b2.

Relay G operates and, at contact g1 closes a circuit for relay E which operates at g2 replaces the earth (about to be replaced by busy flash BF at contact e4) for relay A, at g3 opens the busy tone circuit BT (about to be partly closed at e3), and at g4 closes a point in the circuit of relay H.

Relay E at contact e1 opens the circuit for the operated finger magnet M . . . Q in the register (note that the operated finger is still held by the armature of register relay R), and closes a circuit for one of the ten finger magnets represented by one of the blocks FM1 . . . FM5 as determined by which of the finger magnets M . . . Q had remained operated in response to the first train of impulses. There will thus be a corresponding finger magnet operated in each SRU of the final selector, depending upon the value of the first digit, and consequently a finger will be interposed between the armature of each relay SR and corresponding banks of contacts representing the numerical group (level) selected by this first digit.

At contact e2, a holding earth is extended from contact b2 for relays SR1 . . . SR10, to replace that lost by the operation of relay R. Contacts e3 and e4 have already been noticed.

Conditions are now in order for the reception of the impulses for the second digit, in response to which relays SR1 . . . SR10 operate in succession as before. Relay FP also operates as before.

An important difference has here to be noticed between the operation of the group selector of Fig. 4 and the final selector of Fig. 5. Whereas in the group selector, relay H had to operate as soon as negative was encountered on a P wire as the selector relays SR1 . . . SR10 operated in succession, it must in the final selector operate only in response to negative on a desired line as determined by the second digit now under consideration. It is for this reason that the circuit of relay H is opened at contact c2.

At the termination of the second train of impulses a relay SR depending upon the number of impulses received will be operated, and, because of the prolonged operation of relay A, relay C will release.

Bearing in mind that a finger magnet, determined by the first digit received by the final selector, is energized, the operated relay SR will operate that one of its banks of contacts between which and the armature a finger is interposed. Relay C, when it releases thus connects at contact c2 relay H to the P wire of the wanted line where if the line is free, a negative potential from the cut-off relay of that line will be presented to relay H.

Relay H, at its contacts h1, which are x operated contacts (that is contacts which operate very quickly and before any other contacts of relay H) closes a holding circuit for itself, through its second winding in a circuit which includes contacts f1 and b1. A circuit is also completed by contacts h1 for relay HA. Contacts h2 connect earth to the P wire of the wanted line to operate the cut-off relay thereof and to guard the line against intrusion by other callers. Contacts h3 close a holding circuit from earth at contacts b2 for the operated relay SR and open the holding circuit for relays E, R and G. Contacts h4 and h5 complete a ringing circuit, which includes relay F, for the called line.

Relay HA, at contacts ha1, ha2, and ha3, ha4 connect the even numbered lines (so far disconnected), contacts ha5 connect ringing tone back to the calling line and contacts ha6 disconnect relay FP.

When the called subscriber responds, relay F operates and at contacts f1 (which are x operated contacts) removes a short-circuit from across its own second winding so that it holds, in series with relay H to earth at contact b1. At contacts f2 and f3, relay D is connected to positive and negative, and at contacts f4 and f5 relay D is connected to the called line and ringing is disconnected. At contact f6 ringing tone is disconnected from the calling line.

Relay D operates in the called subscriber's loop and contacts d1 and d2 reverse the direction of current fed to the calling line for, for example, supervisory purposes.

The relays now remaining operated are A, B, D, F, H, HA, and one SRU, and it may be CH if the first digit were higher than 5, and all these relays depend upon the loop around the calling subscriber's line.

When the caller clears, relay A is released and releases relay B upon which, ultimately all the other relays depend.

Had the called line been engaged, relay H, when connected to the P wire thereof at contact c2, would not have been able to operate since it encountered earth instead of negative. Relay C, when it released, opened the holding circuit for relay G which is left dependent solely upon its slow-release feature. When relay G releases it, at contact g2 connects busy flash from BF and at g3 connects busy tone from BT to the calling line, and at contact G4 disconnects relay H from the P wire of the selected line. Relay E remains operated and holds the operated relay SR. When the calling subscriber clears relays A, B, E, SR, and R release.

Had the selected line been any one of a group such as lines to a P. B. X., and had it been free, operations would be as for a normal, single line. Had it been any one of such a group, except the last the selector would have operated to select a succeeding line of the group, and had it been the last of such a group and been busy, operations would have been for a busy, normal, single line.

In order that the selector may select an idle line of a P. B. X group if the first line or a subsequent line except the last is busy, it is necessary to make provision for further stepping the selective relay unit. To this end, a further set of contacts, the lowest in Fig. 5(b) is provided in each bank, and provision is made for connecting earth to these contacts. This is shown in Fig. 6 for two P. B. X groups namely for group numbered .3 and comprising four lines, and group numbered .8 and comprising three lines. It will be seen, that in the case of the group numbered .3, the first three contacts in the P1 bank are earthed and that the last contact is not. Similarly, for the group numbered .8, the first two contacts are earthed and the last is not. We can now consider what happens when a call is made to such a group, and for our present purpose, we will suppose the first line of our group to be 11.

A call to line 11 proceeds exactly as for a single line up to the stage at which testing takes place. If line 11 is idle the connection is established in normal manner. If, however, line 11 is engaged relay G, instead of releasing as for an engaged single line, is held by earth on the P1 bank contacts SR1/11, ch6, h6. This earth is also extended by way of contacts c1 (released), fp3 (operated), sr1/3 (operated) to relay SR2. Relay SR2 operates and at contacts SR2/12 in the P bank presents the P wire of line 12 to relay H. If line 12 is idle, the connection is established as though line 12 had been called. If it is busy, relay H cannot operate and either busy tone will be returned to the caller or SRU3 (not shown) will operate to connect to line 13, depending upon whether the contact of line 13 in bank P1 has not or has earth connected.

It will be recalled, that in the operation of the counting chain each relay SR is released by the operation of a succeeding one. Thus there will momentarily be two relays SR operated at each step. As the selected contacts have springs connected in common, indeed these common springs could be replaced by a bar, it is necessary to separate the circuits of two adjacent SRU's during the stepping operation as otherwise two adjacent lines would be momentarily connected together. This separation is effected by contacts ha1, ha2, and ha3, ha4, in the negative and positive line conductors respectively.

The P wires would also be connected together momentarily during the period that two relays SR were operated together. This would seriously reduce the testing time by that amount. This defect could be overcome by relay contacts, but it is preferred to separate the P wires by rectifiers MRA and MRB (Fig. 5(b)). Thus, a positive on one P wire cannot be transferred to the other.

We claim:

1. A selector-connector for an automatic telephone or like switching system, said selector-connector including a plurality of selective relay units, each selective relay unit comprising a plurality of banks of contacts, an armature, an electro-magnetic winding for operating said armature, a plurality of fingers, each finger associated with a different bank of contacts, a finger magnet for each finger, circuits connecting said relay selective units into a counting chain, a source of impulses, circuits connecting said source of impulses to said counting chain, said counting chain counting the number of impulses applied thereto, a holding circuit for said selective relay units, a register, circuits connecting said counting chain to said register for recording the number of impulses counted by said counting chain, said holding circuit including contacts operated by said register for releasing said counting chain upon recordation of said number of impulses, further circuits connecting said register to finger magnets of said selective relay units for energizing one finger magnet of each relay selective unit to interpose its associated finger between its associated bank and the armature of said relay selective unit, means operating said relay selective units in succession a second time when said counting chain is released, test contacts on each selective relay unit, a test relay, circuits including said test contacts for energizing said test relay if said test contacts connect an idle line to said relay, said test relay when energized arresting successive operation of said selective relay units for said second time and for holding operated the last one operated.

2. A selector-connector for an automatic telephone or like switching system, said selector-connector including a plurality of selective relay units, each selective relay unit comprising a plurality of banks of contacts, an armature, an electro-magnetic winding for operating said armature, a plurality of fingers, each finger associated with a different bank of contacts, a finger magnet for each finger, said selector-connector also including circuits connecting said selective relay units into a counting chain, a source of impulses, circuits connecting said source of impulses to said counting chain, said counting chain counting the number of impulses applied thereto, a holding circuit for said selective relay units, a register, circuits connecting said counting chain to said register for recording the number of impulses counted by said counting chain, said holding circuit including contacts operated by said register for releasing said counting chain upon recordation of said number of impulses, further circuits connecting said register to finger magnets of said selective relay units for energizing one finger magnet of each selective relay unit to interpose its associated finger between its associated bank and the armature of said relay selective unit, means for applying a second series of impulses from said source to said counting chain, said counting chain counting the number of impulses in said second series, and a second holding circuit for holding operated upon cessation of said second series of impulses the last selective relay unit operated by the last impulse of said second series.

3. A selector-connector for an automatic telephone or like switching system as set forth in claim 2, including test contacts on each selective relay unit, a test relay, circuits including said test contacts for energizing said test relay if said test contacts connect an idle line to said relay, and contacts on said test relay for extending a subscriber's line through said selector-connector.

4. An automatic telephone or like switching system including a selector, an incoming line to said selector, a plurality of outgoing lines from said selector, said selector comprising a plurality of selective relay units each having a plurality of banks of contacts with said incoming line connected to contacts in all said banks, and at least one outgoing line connected to contacts in each bank, each selective relay unit having an electro-magnet and an armature, a finger for each bank of contacts, means including a plurality of finger magnets for each selective relay unit, one magnet associated with each bank of contacts for interposing a finger between each blank of contacts and the armatures of said selective relay units, a register, a circuit connecting any one finger magnet in each selective relay unit to said register for simultaneous operation thereby, and other circuits connecting other finger magnets in each selective unit to said register, each said circuit connecting only one such finger magnet in each selective relay unit to said register for simultaneous operation, a source of impulses for operating a counting chain constituted by said selective relay units, means for transferring the setting of the selective relay units to said register, means for thereupon releasing said selective relay units, means causing said register to operate a finger magnet in all said selective relay units, means for thereafter applying a second train of impulses from said source of impulses to said counting chain, said counting chain counting the number of impulses in said train to operate one bank of contacts in one selective relay unit thereby to establish connection to one of said outgoing lines.

5. An automatic telephone or like switching system including a selector, an incoming line to said selector, a plurality of outgoing lines from said selector, said selector comprising a plurality of selective relay units each having a plurality of banks of contacts with said incoming line connected to contacts in all said banks, and at least one outgoing line connected to contacts in each bank, each selective relay unit having an electro-magnet and an armature, means including a plurality of finger magnets for interposing a finger between each bank of contacts and the armatures of said selective relay units, a register, a circuit connecting a finger magnet in each selective relay unit to said register for simultaneous operation thereby, and other circuits connecting other finger magnets in each selective unit to said register, each said circuit connecting only one such finger magnet in each selective relay unit to said register for simultaneous operation, a source of impulses for operating a counting chain constituted by said selective relay units, means for transferring the setting of the selective relay units to said register, means for thereupon releasing said selective relay units, means causing said register to operate a finger magnet in all said selective relay units, and means including test wires of engaged ones of said outgoing lines causing said counting chain to operate a second time to select an idle one of said outgoing lines.

6. A relay selector-connector comprising a plurality of selective relay units each having a plurality of banks of contacts and a finger magnet and finger associated with each bank, an armature and an electro-magnet for each selective relay unit, circuits connecting said selective relay units into a counting chain, means connecting corresponding finger magnets in each selective relay unit, a source of impulses, means for applying impulses from said source in succession to said selective relay units, a register, circuits connecting said selective relay units to said register, said register selecting and operating one finger magnet in each selective relay unit to interpose one finger between one bank of contacts and the armature, means for releasing said counting chain, and circuit means for operating said selective relay units a second time, any selective relay unit when operated a second time holding one finger between one bank of contacts thereof and the armature thereof.

7. In a relay selector the combination of a plurality of relays, circuits interconnecting said relays to constitute a relay counting chain, a first train of impulses, means for applying said first train of impulses to said relay selector, one impulse to each relay in succession, each relay when operated releasing a preceding relay and preparing a circuit for a succeeding relay, a register, circuits interconnecting contacts of said relays and said register whereby said register occupies a condition distinctive of the relay of said plurality operated, means operated by said register upon cessation of said first train of impulses for releasing the last operated one of said relays, a plurality of banks of contacts for each of said relays, means operated by said register for selecting according to the condition of said register one corresponding bank of contacts of each said relay, and a second train of impulses causing said relays of said plurality to operate in succession a second time.

8. An automatic telephone or like switching system including a selector, an incoming line to said selector, said selector comprising a plurality of selective relay units each having a plurality of banks of contacts with said incoming line connected to contacts in all said banks, and at least one outgoing line connected to contacts in each bank, each selective relay unit having an electro-magnet and an armature, means including a plurality of finger magnets for interposing a finger between each bank of contacts and the armatures of said selective relay units, a register, circuits interconnecting corresponding finger magnets of all said selective relay units and said register, a source of impulses for operating said selective relay units, means for transferring the setting of the selective relay units to said register, means for thereupon releasing said selective relay units, means including a relay and a test circuit of outgoing lines preventing establishment of connection between said incoming line and a selected one of said outgoing line if busy.

9. An automatic telephone or like switching system including a selector, an incoming line to said selector, a plurality of outgoing lines from said selector, said outgoing lines divided into groups, said selector comprising a plurality of banks of contacts with said incoming line connected to contacts in all said banks, and at least one outgoing line connected to contacts in each bank, additional contacts in each said bank, connections connecting corresponding additional contacts of a plurality of successive selective relay units belonging to grouped lines, each selective relay unit having an electro-magnet and an armature, means including a plurality of finger magnets for interposing a finger between each bank of contacts and the armatures of said selective relay units, a register, circuits interconnecting corresponding finger magnets of all said selective relay units and said register, a source of impulses for operating said selective relay units, means for transferring the setting of the selective relay units to said register, means for thereupon releasing said selective relay units, means including a relay and the test circuits of outgoing lines for preventing establishment of connection between said incoming line and a selected one of said outgoing line if busy, and means including said additional contacts and said connections for causing the next selective relay units to operate.

10. An automatic telephone or like switching system including a selector, an incoming line to said selector, a plurality of outgoing lines from said selector, said outgoing lines being divided into groups, said selector comprising a plurality of selective relay units each having a plurality of banks of contacts with said incoming line connected to contacts in all said banks, and at least one outgoing line connected to contacts in each bank, additional contacts in each said bank, connections connecting corresponding additional contacts of a plurality of successive selective relay units belonging to grouped lines, each selective relay unit having an electro-magnet and an armature, means including a plurality of finger magnets for interposing a finger between each bank of contacts and the armatures of said selective relay units, a register, circuits interconnecting corresponding finger magnets of all said selective relay units and said register, means including a relay and the test circuit of outgoing lines for preventing establishment of connection between said incoming line and a selected one of said outgoing lines if busy, and means including said additional contacts and said connections for causing the next selective relay unit to operate to establish connection to the next line of said group if idle.

11. An automatic telephone or like switching system including a selector, an incoming line to said selector, a plurality of outgoing lines from said selector, said outgoing lines divided into groups, said selector comprising a plurality of selective relay units each having a plurality of banks of contacts with said incoming line connected to contacts in all said banks, and at least one outgoing line connected to contacts in each bank, additional contacts in each said bank, connections connecting additional contacts in corresponding banks of a plurality of successive relays belonging to grouped lines, a source of impulses, circuits connecting said source of impulses to said selector to cause a first sequential operation of said selective relay units, each selective relay unit having an electro-magnet and an armature, means including a plurality of finger magnets for interposing a finger between each bank of contacts and the armatures of said selective relay units, a register, circuits connecting said selector to said register to set said register according to the number of impulses applied to said selector, circuits interconnecting corresponding finger magnets of all said selective relay units, circuits connecting said register to said finger magnets to energize one of them according to the number registered by said register so as to select an outgoing line-group, said circuits connecting said source of impulses causing a second sequential operation of said selective relay units to select an outgoing line in the selected outgong line group, means including a test relay and the test circuit of outgoing lines preventing establishment of a connection between said incoming line and said selected one of said outgoing lines if busy, means including said additional contacts to cause operation of a further selective relay unit to select the next outgoing line of said grouped lines, and means including said test relay and the test circuit of the next line of said grouped lines for preventing establishment of connection between said incoming line and said next line if busy.

References Cited in the file of this patent

UNITED STATES PATENTS

| | | |
|---|---|---|
| 1,533,154 | Williams | Apr. 14, 1925 |
| 1,568,039 | Williams et al. | Dec. 29, 1925 |
| 1,575,326 | From | Mar. 2, 1926 |
| 1,593,387 | Clark | July 20, 1926 |
| 1,923,060 | Appelius | Aug. 22, 1933 |
| 2,285,985 | King | June 9, 1942 |
| 2,499,542 | Thunell et al. | Mar. 7, 1950 |
| 2,504,274 | Nillson et al. | Apr. 18, 1950 |